(12) United States Patent
Park et al.

(10) Patent No.: US 9,587,716 B1
(45) Date of Patent: Mar. 7, 2017

(54) PLANETARY GEAR TRAIN OF AUTOMATIC TRANSMISSION FOR VEHICLES

(71) Applicant: Hyundai Motor Company, Seoul (KR)

(72) Inventors: JongSool Park, Hwaseong-Si (KR); Dong Hwan Hwang, Seoul (KR); Seong Wook Hwang, Gunpo-Si (KR); Seongwook Ji, Ansan-Si (KR); Chang Wook Lee, Suwon-Si (KR); Hyun Sik Kwon, Seoul (KR); SeokJin Kim, Hwaseong-Si (KR); KyeongHun Lee, Seoul (KR); Wonmin Cho, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/956,344

(22) Filed: Dec. 1, 2015

(30) Foreign Application Priority Data

Sep. 14, 2015 (KR) .......................... 10-2015-0129867

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 2008/0015074 A1* | 1/2008 | Kamm | ................... | F16H 3/666 475/102 |
| 2009/0036253 A1* | 2/2009 | Phillips | ..................... | F16H 3/66 475/275 |
| 2011/0045940 A1* | 2/2011 | Gumpoltsberger | ....... | F16H 3/66 475/275 |
| 2015/0369341 A1* | 12/2015 | Beck | ......................... | F16H 3/66 475/277 |
| 2016/0108996 A1* | 4/2016 | Ji | ............................ | F16H 3/66 475/275 |

FOREIGN PATENT DOCUMENTS

| | | |
|---|---|---|
| JP | 2013-204707 A | 10/2013 |
| JP | 2014-500461 A | 1/2014 |

* cited by examiner

*Primary Examiner* — Justin Holmes
(74) *Attorney, Agent, or Firm* — Morgan, Lewis & Bockius LLP

(57) ABSTRACT

A planetary gear train of an automatic transmission may include an input shaft; an output shaft; first to fourth planetary gear sets and six control elements disposed at a portion selectively connecting the rotation elements and the rotation elements or a portion selectively connecting the rotation elements and the transmission housing, wherein the input shaft is continuously connected to the third rotation element, the output shaft is continuously connected to the twelfth rotation element, the first rotation element is continuously connected to the transmission housing, the fourth rotation element is continuously connected to the seventh rotation element, the fourth rotation element is continuously connected to the tenth rotation element, the eighth rotation element is continuously connected to the twelfth rotation element, the fifth rotation element is selectively connected to the transmission housing.

10 Claims, 2 Drawing Sheets

FIG. 2

| Speed stages | Control element | | | | | | Gear ratio | Ratio between speed stages | Span of a gear ratio |
|---|---|---|---|---|---|---|---|---|---|
| | B1 | B2 | C1 | C2 | C3 | C4 | | | |
| D1 |  | ● |  |  | ● | ● | 6.045 | - | 9.2 (Tuning available) |
| D2 |  | ● | ● |  | ● |  | 3.720 | 1.625 | |
| D3 |  | ● | ● |  |  | ● | 2.297 | 1.620 | |
| D4 |  | ● | ● | ● |  |  | 1.563 | 1.470 | |
| D5 |  |  | ● | ● |  | ● | 1.193 | 1.310 | |
| D6 |  |  | ● | ● | ● |  | 1.000 | 1.193 | |
| D7 |  |  |  | ● | ● | ● | 0.909 | 1.100 | |
| D8 | ● |  |  | ● | ● |  | 0.793 | 1.146 | |
| D9 | ● |  |  | ● |  | ● | 0.658 | 1.205 | |
| REV | ● | ● |  |  |  | ● | -3.755 | - | - |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0129867 filed on Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to that improves power delivery performance and fuel consumption and obtains a linearity between step ratios of transmission steps by enlarging a span of gear ratios while achieving nine forward speed stages using a minimum number of constituent elements.

Description of Related Art

The recent increase in oil prices causes carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, costs, weight and power transmission efficiency.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and researches and developments are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

In a case in which a span of a gear shift ratio in the eight-speed automatic transmission is increased to the level of 9.0 or more, because it is impossible to ensure linearity of step ratios between gear shift stages, driving efficiency of the engine and drivability of the vehicle deteriorate.

Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency and ensures linearity of step ratios between transmission steps by increasing a span of gear ratios while realizing at least nine forward speed or more stages and at least one reverse speed or more stage by using a minimum number of constituent elements.

A planetary gear train of an automatic transmission for vehicles according to the present invention includes an input shaft receiving power of an engine; an output shaft outputting shifted power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; and six control elements disposed at a portion selectively connecting the rotation elements and the rotation elements or a portion selectively connecting the rotation elements and the transmission housing, wherein the input shaft is continuously connected to the third rotation element, the output shaft is continuously connected to the twelfth rotation element, the first rotation element is continuously connected to the transmission housing, the fourth rotation element is continuously connected to the seventh rotation element, the fourth rotation element is continuously connected to the tenth rotation element, the eighth rotation element is continuously connected to the twelfth rotation element, the fifth rotation element is selectively connected to the transmission housing, while three control elements of the six control elements are operated, at least nine forward speed stages and at least one reverse speed stage are implemented.

The ninth rotation element may be selectively connected to the transmission housing, the input shaft may be selectively connected to the fifth rotation element, the input shaft may be selectively connected to the eleventh rotation element, the fifth rotation element may be selectively connected to the sixth rotation element, and the second rotation element may be selectively connected to the sixth rotation element.

The first, second, and third rotation elements of the first planetary gear set may be a sun gear, a planetary carrier, and a ring gear, respectively, the fourth, fifth, and sixth rotation elements of the second planetary gear set may be a sun gear, a planetary carrier, and a ring gear, the seventh, eighth, and ninth rotation elements of the third planetary gear set may be a sun gear, a planetary carrier, and a ring gear, respectively, and the tenth, eleventh, and twelfth rotation elements of the fourth planetary gear set may be a sun gear, a planetary carrier, and a ring gear, respectively.

The planetary gear train according to an exemplary embodiment of the present invention may implement the gear shift stages for nine forward speed stages and one reverse speed stage by combining four planetary gear sets with the six control elements.

In addition, a span of a gear shift ratio is 9.0 or more, thereby maximizing driving efficiency of the engine.

In addition, the linearity of the interstage ratio of the shift stage is secured while multi-staging the shift stage at high efficiency, thereby making it possible to improve drivability such as acceleration before and after the shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to the planetary gear train according to the first exemplary embodiment of the present invention.

Figure 1:
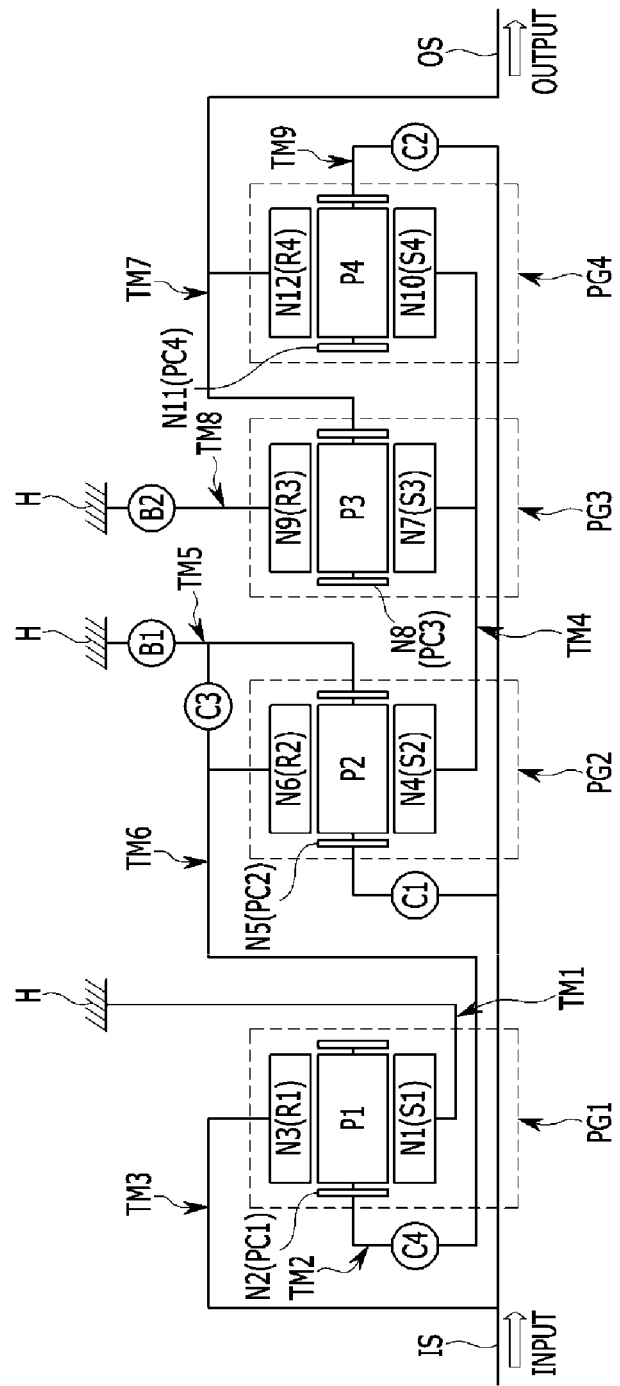
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

However, parts which are not related with the description are omitted for clearly describing the exemplary embodiment of the present invention, and like reference numerals refer to like or similar elements throughout the specification.

In the following description, dividing names of components into first, second, and the like is to divide the names because the names of the components are the same as each other, and an order thereof is not particularly limited.

FIG. 1 is a configuration diagram of a planetary gear train according to a first exemplary embodiment of the present invention.

Referring to FIG. 1, the planetary gear train according to an exemplary embodiment of the present invention includes first, second, third, fourth planetary gear sets PG1, PG2, PG3, and PG4 disposed on the same axis, an input shaft IS, an output shaft OS, nine rotating shafts TM1 to TM9 directly connecting to each other through respective rotation elements of the first, second, third, and fourth planetary gear sets PG1, PG2, PG3, and PG4, six control elements C1-C4 and B1-B2, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 is a single pinion planetary gear set, and includes rotation elements including a first sun gear S1 which is a first rotation element N1, a first planet carrier PC1 which is a second rotation element N2 for supporting a first pinion P1 that externally engages with the first sun gear S1 that is the first rotation element N1, and a first ring gear R1 which is a third rotation element N3 that internally engages with the first pinion P1.

The second planetary gear set PG2 is a single pinion planetary gear set, and includes a second sun gear S2 which is a fourth rotation element N4, a second planet carrier PC2 which is a fifth rotation element N5 for supporting a second pinion P2 that externally engages with the second sun gear S2 that is the fourth rotation element N4, and a second ring gear R2 which is a sixth rotation element N6 that internally engages with the second pinion P2.

The third planetary gear set PG3 is a single pinion planetary gear set, and includes a third sun gear S3 which is a seventh rotation element N7, a third planet carrier PC3 which is an eighth rotation element N8 for supporting a third pinion P3 that externally engages with the third sun gear S3 that is the seventh rotation element N7, and a third ring gear R3 which is a ninth rotation element N9 that internally engages with the third pinion P3.

The fourth planetary gear set PG4 is a single pinion planetary gear set and includes a fourth sun gear S4 which is a tenth rotation element N10, a fourth planet carrier PC4 which is an eleventh rotation element N11 for supporting a fourth pinion P4 that externally engages with the fourth sun gear S4 that is the tenth rotation element N10, and a fourth ring gear R4 which is a twelfth rotation element N12 that internally engages with the fourth pinion P4.

The first, second, third, and fourth planetary gear sets PG1, PG2, PG3, and PG4 are operated while the fourth rotation element N4 is directly connected to the seventh rotation element N7 and the tenth rotation element N10, and the eighth rotation element N8 is directly connected to the twelfth rotation element N12 and total nine rotating shafts TM1-TM9.

The configurations of the nine rotating shafts TM1 to TM9 will be described below.

The first rotating shaft TM1 includes a first rotation element N1 (a first sun gear S1) and is directly connected to the transmission housing H.

The second rotating shaft TM2 includes a second rotation element N2 (a first planetary carrier PC1).

The third rotating shaft TM3 includes a third rotation element N3 (a first ring gear R1) and i directly connected to the input shaft IS.

The fourth rotating shaft TM4 includes a fourth rotation element N4 (a second sun gear N2), a seventh rotation element N7 (a third sun gear N3), a tenth rotation element N10 (a fourth sun gear N4).

The fifth rotating shaft TM5 includes a fifth rotation element N5 (a second planetary carrier PC2) and is selectively connected to the third rotating shaft TM3 including the input shaft IS and simultaneously is selectively connected to the transmission housing H.

The sixth rotating shaft TM6 includes a sixth rotation element N6 (a second ring gear R2) and is selectively connected to the second rotating shaft TM2 and the fifth rotating shaft TM5.

The seventh rotating shaft TM7 includes the eighth rotation element N8 (a third planetary carrier PC3) and the twelfth rotation element N12 (a fourth ring gear R4) and is directly connected to the output shaft OS to be operated as an output element.

The eighth rotating shaft TM8 includes the ninth rotation element N9 (a third ring gear R3) and is selectively connected to the transmission housing H.

The ninth rotating shaft TM9 includes the eleventh rotation element N11 (a third planetary carrier PC3) and is selectively connected to the third rotating shaft TM3 including the input shaft IS.

Further, four clutches C1, C2, C3, and C4, which are control elements, are disposed at portions where the rotating shafts of the rotating shafts TM1 to TM9 are selectively connected to each other.

In addition, two brakes Bland B2, which are control elements, are disposed at portions where the rotating shafts of the rotating shafts TM1 to TM9 are selectively connected with the transmission housing H.

The arrangement positions of the six control elements C1-C4 and B1-B2 will be described below.

The first clutch C1 is disposed between the third rotating shaft TM3 including the input shaft IS and the fifth rotating shaft TM5 to selectively integrate the third rotating shaft TM3 and the fifth rotating shaft TM5.

The second clutch C2 is disposed between the third rotating shaft TM3 including the input shaft IS and the ninth rotating shaft TM9 to selectively integrate the third rotating shaft TM3 and the ninth rotating shaft TM9.

The third clutch C3 is interposed between the fifth rotating shaft TM5 and the sixth rotating shaft TM6 to selectively integrate the fifth rotating shaft TM5 and the sixth rotating shaft TM6.

The fourth clutch C4 is interposed between the second rotating shaft TM2 and the sixth rotating shaft TM6 to selectively integrate the second rotating shaft TM2 and the sixth rotating shaft TM6.

The first brake B1 is interposed between the fifth rotating shaft TM5 and the transmission housing H to selectively operate the fifth rotating shaft TM5 as a fixing element.

The second brake B2 is interposed between the eighth rotating shaft TM8 and the transmission housing H to selectively operate the eighth rotating shaft TM8 as a fixing element.

The respective control elements including the first, second, third, and fourth clutches C1, C2, C3, and C4, and the first and second brakes B1 and B2 may be formed of a multi-plate type hydraulic friction coupling unit which is frictionally coupled by hydraulic pressure.

FIG. 2 is an operation table for each of transmission steps of respective control elements applied to the planetary gear train according to the first exemplary embodiment of the present invention.

As shown in FIG. 2, the planetary gear train according to the exemplary embodiment of the present invention is shifted while three control elements are operated in each shift stage.

At the first forward speed stage D1, the third and fourth clutches C3 and C4 and the second brake B2 are simultaneously operated. Therefore, in a state in which the sixth rotating shaft TM6 is connected to the sixth rotating shaft TM6 to each other by the operation of the third clutch C3 and the second rotating shaft TM2 is connected to the sixth rotating shaft TM6 by the operation of the fourth clutch C4, the power is inputted to the third rotating shaft TM3, while the first rotating shaft TM1 is operated as a fixing element and simultaneously the eighth rotating shaft TM8 is operated as a fixing element by the operation of the second brake B2, the first forward speed is realized and the power is output through the output shaft OS including the seventh rotating shaft TM7.

At the second forward speed stage D2, the first and third clutches C1 and C3 and the second brake B2 are simultaneously operated. Therefore, in a state in which the third rotating shaft TM3 including the input shaft IS is connected to the fifth rotating shaft TM5 by the operation of the first clutch C1 and the fifth rotating shaft TM5 is connected to the sixth rotating shaft TM6 to each other by the operation of the third clutch C3, the power is simultaneously inputted to the third rotating shaft TM3 and the fifth rotating shaft TM5, while the first rotating shaft TM1 is operated as a fixing element and simultaneously the eighth rotating shaft TM8 is operated as a fixing element by the operation of the second brake B2, the second forward speed is realized and the power is output through the output shaft OS including the seventh rotating shaft TM7.

At the third forward speed stage D3, the first and fourth clutches C1 and C4 and the second brake B2 are simultaneously operated. Therefore, in a state in which the third rotating shaft TM3 including the input shaft IS is connected to the fifth rotating shaft TM5 to each other by the operation of the first clutch C1 and the second rotating shaft TM2 is connected to the sixth rotating shaft TM6 to each other by the operation of the fourth clutch C4, the power is simultaneously inputted to the third rotating shaft TM3 and the fifth rotating shaft TM5, while the first rotating shaft TM1 is operated as a fixing element and simultaneously the eighth rotating shaft TM8 is operated as a fixing element by the operation of the second brake B2, the third forward speed is realized and the power is output through the output shaft OS including the seventh rotating shaft TM7.

At the fourth forward speed stage D4, the first and second clutches C1 and C2 and the second brake B2 are simultaneously operated. Therefore, in a stage in which the third rotating shaft TM3 including the input shaft IS is connected to the fifth rotating shaft TM5 to each other by the operation of the first clutch C1 and the third rotating shaft TM3 including the input shaft IS is connected to the ninth rotating shaft TM9 to each other by the operation of the second clutch C2, the power is simultaneously inputted to the third, fifth, and ninth rotating shafts TM3, TM5, and TM9, while the first rotating shaft TM1 is operated as a fixing element and simultaneously the eighth rotating shaft TM8 is operated as a fixing element by the operation of the second brake B2, the fourth forward speed is realized and the power is output through the output shaft OS including the seventh rotating shaft TM7.

At the fifth forward speed stage D5, the first, second, and fourth clutches C1, C2, and C4 are simultaneously operated. Therefore, in a state in which the third rotating shaft TM3 including the input shaft IS is connected to the fifth rotating shaft TM5 to each other by the operation of the first clutch C1, the third rotating shaft TM3 including the input shaft IS is connected to the ninth rotating shaft TM9 to each other by the operation of the second clutch C2, and the second rotating shaft TM2 is connected to the sixth rotating shaft TM6 to each other by the operation of the fourth clutch C4, the power is simultaneously inputted to the third, fifth, and ninth rotating shafts TM3, TM5, and TM9, while the first rotating shaft TM1 is operated as a fixing element, the fifth forward speed is realized and the power is output through the output shaft OS including the seventh rotating shaft TM7.

At the sixth forward speed stage D6, the first, second, and third clutches C1, C2, and C3 are simultaneously operated. Therefore, in a state in which the third rotating shaft TM3 including the input shaft IS is connected to the fifth rotating shaft TM5 to each other by the operation of the first clutch C1, the third rotating shaft TM3 including the input shaft IS is connected to the ninth rotating shaft TM9 to each other by the operation of the second clutch C2, and the fifth rotating shaft TM5 is connected to the sixth rotating shaft TM6 to each other by the operation of the third clutch C3, the power is simultaneously inputted to the third, fifth, ninth rotating shaft TM3, TM5, and TM9, while the first rotating shaft TM1 is operated as a fixing element, the sixth forward speed is realized and the power is output through the output shaft OS including the seventh rotating shaft TM7.

At the seventh forward speed stage D7, the second, third, and fourth clutches C2, C3, and C4 are simultaneously operated. Therefore, in a state in which the third rotating shaft TM3 including the input shaft IS is connected to the ninth rotating shaft TM9 to each other by the operation of the second clutch C2, the fifth rotating shaft TM5 connected to the sixth rotating shaft TM6 to each other by the operation of the third clutch C3, and second rotating shaft TM2 is connected to the sixth rotating shaft TM6 to each other by the operation of the fourth clutch C4, the power is simultaneously inputted to the third and ninth rotating shafts TM3 and TM9, while first rotating shaft TM1 is operated as a fixing element, the seventh forward speed is realized and the power is output through the output shaft OS including the seventh rotating shaft TM7.

At the eighth forward speed stage D8, the second and third clutches C2 and C3 and the first brake B1 are simultaneously operated. Therefore, in a state in which the third rotating shaft TM3 including the input shaft IS is connected to the ninth rotating shaft TM9 to each other by the operation of the second clutch C2 and the fifth rotating shaft TM5 is connected to the sixth rotating shaft TM6 to each other by the operation of the third clutch C3, the power is inputted to the third and ninth rotating shafts TM3 and TM9, while the first rotating shaft TM1 is operated as a fixing element and simultaneously the fifth rotating shaft TM5 is operated as a fixing element by the operation of the first brake B1, the eighth forward speed is realized and the power is output through the output shaft OS including the seventh rotating shaft TM7.

At the ninth forward speed stage D9, the second and fourth clutches C2 and C4 and the first brake B1 are simultaneously operated. Therefore, in a state in which the third rotating shaft TM3 including the input shaft IS is connected to the ninth rotating shaft TM9 to each other by the operation of the second clutch C2 and the second rotating shaft TM2 is connected to the sixth rotating shaft TM6 to each other by the operation of the fourth clutch C4, the power is inputted to the third and ninth rotating shafts TM3 and TM9, while the first rotating shaft TM1 is operated as a fixing element and simultaneously the fifth rotating shaft TM5 is operated as a fixing element by the operation of the first brake B1, the ninth forward speed is realized and the power is output through the output shaft OS including the seventh rotating shaft TM7.

At the reverse speed stage REV, the fourth clutch C1 and the first and second brakes B1 and B2 are simultaneously operated. Therefore, in a state in which the second rotating shaft TM2 is connected to the sixth rotating shaft TM6 to each other by the operation of the fourth clutch C4, the power is inputted to the third rotating shaft TM3, while the first rotating shaft TM1 is operated as a fixing element and simultaneously the fifth rotating shaft TM5 and the eighth rotating shaft TM8 are operated as a fixing element by the operation of the first brake B1 and the second brake B2, the reverse speed is realized and the power is output through the output shaft OS including the seventh rotating shaft TM7.

The planetary gear train according to the exemplary embodiment of the present invention may implement the gear shift stages for nine forward speed stages and one reverse speed stage by operating and controlling the four planetary gear sets PG1, PG2, PG3, and PG4 using the four clutches C1, C2, C3, and C4 and the two brakes B1 and B2.

In addition, the linearity of the interstage ratio of the shift stage is secured while multi-staging the shift stage at high efficiency, thereby making it possible to improve drivability such as acceleration before and after the shift, an engine speed rhythmic sense, and the like.

In addition, a span of a gear shift ratio is 9.0 or more, thereby maximizing driving efficiency of the engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving power of an engine;
   an output shaft outputting shifted power;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element; and
   six control elements disposed at a portion selectively connecting the rotation elements and the rotation elements or a portion selectively connecting the rotation elements and a transmission housing, wherein the input shaft is continuously connected to the third rotation element, the output shaft is continuously connected to the twelfth rotation element, the first rotation element is continuously connected to the transmission housing, the fourth rotation element is continuously connected to the seventh rotation element, the fourth rotation element is continuously connected to the tenth rotation element, the eighth rotation element is continuously connected to the twelfth rotation element, the fifth rotation element is selectively connected to the transmission housing, while three control elements of the six control elements are operated, at least nine forward speed stages and at least one reverse speed stage are implemented.

2. The planetary gear train of claim 1, wherein
the ninth rotation element is selectively connected to the transmission housing
the input shaft is selectively connected to the fifth rotation element,
the input shaft is selectively connected to the eleventh rotation element,
the fifth rotation element is selectively connected to the sixth rotation element,
the second rotation element is selectively connected to the sixth rotation element.

3. The planetary gear train of claim 1, wherein
the first rotation element, the second rotation element, and the third rotation element of the first planetary gear set are a sun gear, a planetary carrier, and a ring gear, respectively,
the fourth rotation element, the fifth rotation element, and the sixth rotation element of the second planetary gear set are a sun gear, a planetary carrier, and a ring gear,
the seventh rotation element, the eighth rotation element, and the ninth rotation element of the third planetary gear set are a sun gear, a planetary carrier, and a ring gear, respectively,
the tenth rotation element, the eleventh rotation element, and the twelfth rotation element of the fourth planetary gear set are a sun gear, a planetary carrier, and a ring gear, respectively.

4. A planetary gear train of an automatic transmission for a vehicle comprising:
an input shaft receiving power of an engine;
an output shaft outputting shifted power;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a fourth planetary gear set having a tenth rotation element, an eleventh rotation element, and a twelfth rotation element; and
six control elements disposed at a portion selectively connecting the rotation elements and the rotation elements or a portion selectively connecting the rotation elements and a transmission housing;
a first rotating shaft including the first rotation element and directly connected to the transmission housing;
a second rotating shaft including the second rotation element;
a third rotating shaft including the third rotation element and directly connected to the input shaft;
a fourth rotating shaft including the fourth rotation element, the seventh rotation element, and the tenth rotation element;
a fifth rotating shaft including the fifth rotation element and selectively connected to the third rotating shaft including the input shaft and simultaneously connected to the transmission housing;
a sixth rotating shaft including the sixth rotation element and selectively connected to the second rotating shaft and the fifth rotating shaft;
a seventh rotating shaft including the eighth rotation element and the twelfth rotation element and directly connected to the output shaft;
a eighth rotating shaft including the ninth rotation element and selectively connected to the transmission housing; and
a ninth rotating shaft including the eleventh rotation element and selectively connected to the third rotating shaft including the input shaft.

5. The planetary gear train of claim 4, wherein
the first planetary gear set is a single-pinion planetary gear set, in which the first rotation element is a first sun gear, the second rotation element is a first planet carrier, and the third rotation element is a first ring gear,
the second planetary gear set is a single-pinion planetary gear set, in which the fourth rotation element is a second sun gear, the fifth rotation element is a second planet carrier, and the sixth rotation element is a second ring gear,
the third planetary gear set is a single-pinion planetary gear set, in which the seventh rotation element is a third sun gear, the eighth rotation element is a third planet carrier, and the ninth rotation element is a third ring gear, and
the fourth planetary gear set is a single-pinion planetary gear set, the tenth rotation element is a fourth sun gear, the eleventh rotation element is a fourth planet carrier, and the twelfth rotation element is a fourth ring gear.

6. The planetary gear train of claim 4, wherein the six control elements includes:
a first clutch selectively connecting the third rotating shaft and the fifth rotating shaft;
a second clutch selectively connecting the third rotating shaft and the ninth rotating shaft;
a third clutch selectively connecting the fifth rotating shaft and the sixth rotating shaft;
a fourth clutch selectively connecting the second rotating shaft and the sixth rotating shaft;
a first brake selectively connecting the fifth rotating shaft and the transmission housing; and
a second brake selectively connecting the eighth rotating shaft and the transmission housing.

7. The planetary gear train of claim 6, wherein
speed stages realized by the selective operation of the six control elements include
a first forward speed stage by a simultaneous operation of the third and fourth clutches and the second brake;
a second forward speed stage by a simultaneous operation of the first and third clutches and the second brake;
a third forward speed stage by a simultaneous operation of the first and fourth clutches and the second brake;

a fourth forward speed stage by a simultaneous operation of the first clutch and the second clutch and the second brake;
a fifth forward speed stage by a simultaneous operation of the first, second, and fourth clutches;
a sixth forward speed stage by a simultaneous operation of the first, second, and third clutches;
a seventh forward speed stage by a simultaneous operation of the second, third, and fourth clutches;
an eighth forward speed stage by a simultaneous operation of the second and third clutches and the first brake;
a ninth forward speed stage by a simultaneous operation of the second and fourth clutches and the first brake; and
a reverse speed stage by a simultaneous operation of the fourth clutch and the first and second brakes.

8. A planetary gear train of an automatic transmission for a vehicle comprising:
an input shaft receiving power of an engine;
an output shaft outputting shifted power;
a first planetary gear set made of a single pinion planetary gear set and including a a first rotation element, a second rotation element, and a third rotation element;
a second planetary gear set made of a single pinion planetary gear set and including a a fourth rotation element, a fifth rotation element, and a sixth rotation element;
a third planetary gear set made of a single pinion planetary gear set and including a a seventh rotation element, an eighth rotation element, and a ninth rotation element; and
a fourth planetary gear set made of a single pinion planetary gear set and including a a tenth rotation element, an eleventh rotation element, and a twelfth rotation element,
a first rotating shaft including the first rotation element and directly connected to a transmission housing;
a second rotating shaft including the second rotation element;
a third rotating shaft including the third rotation element and directly connected to the input shaft;
a fourth rotating shaft including the fourth rotation element, the seventh rotation element, and the tenth rotation element;
a fifth rotating shaft including the fifth rotation element and selectively connected to the third rotating shaft including the input shaft and simultaneously to the transmission housing;
a sixth rotating shaft including the sixth rotation element and selectively connected to the second rotating shaft and the fifth rotating shaft;
a seventh rotating shaft including the eighth rotation element and the twelfth rotation element and directly connected to the output shaft;
an eighth rotating shaft including the ninth rotation element and selectively connected to the transmission housing;
a ninth rotating shaft including the eleventh rotation element and selectively connected to the third rotating shaft including the input shaft;
a first clutch selectively connecting the third rotating shaft and the fifth rotating shaft;
a second clutch selectively connecting the third rotating shaft and the ninth rotating shaft;
a third clutch selectively connecting the fifth rotating shaft and the sixth rotating shaft;
a fourth clutch selectively connecting the second rotating shaft and the sixth rotating shaft;
a first brake selectively connecting the fifth rotating shaft and the transmission housing; and
a second brake selectively connecting the eighth rotating shaft and the transmission housing.

9. The planetary gear train of claim 8, wherein
the first planetary gear set includes the first rotation element made of the first sun gear, the second rotation element made of the first planetary carrier, and the third rotation element made of the first ring gear,
the second planetary gear set includes the fourth rotation element made of the second sun gear, the fifth rotation element made of the second planetary carrier, and the sixth rotation element made of the second ring gear,
the third planetary gear set includes the seventh rotation element made of the third sun gear, the eighth rotation element made of the third planetary carrier, and ninth rotation element made of the third ring gear, and
the fourth planetary gear set includes the tenth rotation element made of the fourth sun gear, the eleventh rotation element made of the fourth planetary carrier, and the twelfth rotation element made of the fourth ring gear.

10. The planetary gear train of claim 8, wherein the speed stages realized by the selective operation of four clutches and two brakes include:
a first forward speed stage by a simultaneous operation of the third and fourth clutches and the second brake;
a second forward speed stage by a simultaneous operation of the first and third clutches and the second brake;
a third forward speed stage by a simultaneous operation of the first and fourth clutches and the second brake;
a fourth forward speed stage by a simultaneous operation of the first clutch and the second clutch and the second brake;
a fifth forward speed stage by a simultaneous operation of the first, second, and fourth clutches;
a sixth forward speed stage by a simultaneous operation of the first, second, and third clutches;
a seventh forward speed stage by a simultaneous operation of the second, third, and fourth clutches;
an eighth forward speed stage by a simultaneous operation of the second and third clutches and the first brake;
a ninth forward speed stage by a simultaneous operation of the second and fourth clutches and the first brake; and
a reverse speed stage by a simultaneous operation of the fourth clutch and the first and second brakes.

* * * * *